United States Patent [19]

Degman, Jr. et al.

[11] Patent Number: 4,788,169

[45] Date of Patent: Nov. 29, 1988

[54] LOW ACIDITY ALUMINA-BOUND ZEOLITES CONTAINING TETRAHEDRAL BORON, GALLIUM, INDIUM AND/OR THALLIUM

[75] Inventors: Thomas F. Degman, Jr., Yardley, Pa.; John D. Lutner, Hamilton Sq.; Nai Y. Chen, Titusville, both of N.J.

[73] Assignee: Mobil Oil Corporation, New York, N.Y.

[21] Appl. No.: 112,342

[22] Filed: Oct. 26, 1987

[51] Int. Cl.$^4$ ............................ B01J 29/06; B01J 29/28
[52] U.S. Cl. ........................................ 502/61; 502/64; 502/71
[58] Field of Search ............................ 502/61, 71, 64

[56] References Cited

U.S. PATENT DOCUMENTS

| | | | |
|---|---|---|---|
| 4,268,420 | 5/1981 | Klotz | 252/432 |
| 4,427,786 | 1/1984 | Miale et al. | 502/71 |
| 4,468,475 | 8/1984 | Kuehl | 502/71 |
| 4,524,140 | 6/1985 | Chang et al. | 502/71 |
| 4,559,314 | 12/1985 | Shihabi | 502/71 |
| 4,576,805 | 3/1986 | Chang et al. | 423/277 |
| 4,665,043 | 5/1987 | Chu et al. | 502/71 |
| 4,683,214 | 7/1987 | Angevine et al. | 502/66 |

OTHER PUBLICATIONS

J. Cat. 93, 471–474 (1985), Shihabi et al., "Aluminum Insertion Into High-Silica Zeolite Frameworks".

*Primary Examiner*—Carl F. Dees
*Attorney, Agent, or Firm*—Alexander J. McKillop; Michael G. Gilman; Marina V. Schneller

[57] ABSTRACT

A method for preparing low acidity alumina bound zeolites containing tetrahedral boron, gallium, indium and/or thallium which comprises ammonium-exchanging an organic-sorbed zeolite followed by calcination.

27 Claims, No Drawings

LOW ACIDITY ALUMINA-BOUND ZEOLITES CONTAINING TETRAHEDRAL BORON, GALLIUM, INDIUM AND/OR THALLIUM

This application relates to a method for preparing low acidity, alumina-bound zeolites containing tetrahedral boron, gallium, indium and/or gallium.

Zeolite catalysts, also known as porous crystalline silicate catalysts, have become widely used in the processing of petroleum and in the production of various petrochemicals. Reactions such as cracking, hydrocracking, alkylation, dealkylation, transalkylation, isomerization, polymerization, addition, disproportionation and other acid catalyzed reactions may be performed with the aid of these catalysts. Both natural and synthetic zeolites are known to be active for reactions of these kinds.

Synthetic zeolites containing high proportions of silica relative to alumina have been developed and zeolites of this kind have shown themselves to be useful. U.S. Pat. No. 3,702,886 to Argauer et al discloses a class of crystalline aluminosilicates designated ZSM-5 which have highly advantageous properties. U.S. Pat. No. 3,941,871 and its U.S. Pat. No. Re. 29,948 to Dwyer et al disclose crystalline organosilicates which exhibit a structure, as evidenced by X-ray diffraction pattern, similar to that of ZSM-5, but with high ratios of silica relative to alumina. Materials of this kind are stated to exhibit low aging rates and to have low coke making properties when used in hydrocarbon processing.

Various treatments have been proposed in the past for modifying the activity of the zeolites, either by reducing it when too active or by increasing it when insufficient. One such treatment has been steaming which in the past has generally been used to decrease the activity of the zeolite, as reported in "Fluid Catalytic Cracking with Zeolite Catalysts", Venuto and Habib, Marcels Dekker Inc., N.Y., N.Y. 1979.

Another such treatment, disclosed in U.S. Pat. No. 4,559,314, incorporated herein by reference, involves activating a highly siliceous zeolite by combining it with a binder of alumina and water and subjecting the resulting composite to steaming.

In certain instances maintaining a low acid activity in a hydrocarbon process catalyst is particularly desirable where it is accompanied by an improvement in other characteristics of the zeolite, for example, resistance to aging. Control of acidity can also be important where metal promoters are associated with the catalyst and a balance between metal activity and acid activity is needed, e.g., in isomerization reactions.

One way of lowering acidity in a zeolite catalyst is to substitute a different element for framework aluminium in the zeolite, e.g., by isomorphous substitution. A description of such a treatment can be found in U.S. Pat. No. 4,576,805, incorporated herein by reference.

Substitution of another Group IIIA element, e.g., boron, gallium, indium and/or thallium, for aluminum is known to reduce the acid activity of a zeolite. However, if such a zeolite of reduced acidic character is composited with alumina binder, an undesirable increase in activity can occur as the aluminum is exchanged for other Group IIIA metal cations. The degree of this facile exchange is difficult to control and frequently occurs even in situations where zeolite activation is undesirable. Further discussion of alumina binder activation can be found in D. S. Shihabi et al, J. Catal. 93, 471 (1985), incorporated herein by reference.

It has now been found that alumina bound zeolites having other Group IIIA elements substituted for framework aluminum can be prepared without undesirable increases in acidity. The method of the present invention requires that the zeolite be ammonium ion exchanged while containing a bulky sorbed organic such as a quaternary ammonium ion and thereafter exposed to calcination conditions. The zeolite may be thus treated either before compositing, during compositing or after compositing with alumina binder. Generally, the bulky sorbed organic is incorporated in the zeolite during synthesis. However, where less bulky organics are employed as synthesis directing agents, or if no organic directing agent at all is used for synthesis, the bulky organic can be sorbed by the zeolite after crystallization. U.S. Pat. No. 4,683,214, incorporated herein by reference, discloses a preparation of a noble metal-containing zeolite beta wherein the crystallized zeolite is exchanged with ammonium nitrate and subsequently calcined (column 11, line 16 to 40). However, no mention is made of operating with a low acidity zeolite which contains other Group IIIA elements substituted for framework aluminum. U.S. Pat. No. 4,268,420 teaches a catalytic composition comprising a boron-containing crystalline silicate composited with alumina, but appears to teach calcining the silicate prior to ammonium-exchange (column 13, lines 64 to 65, column 14, lines 3 to 9).

In one aspect, the present invention relates to a process for preparing alumina-bound, high silica zeolites which comprises:

(a) synthesis of the zeolite in the presence of a bulky organic directing agent such as an alkylammonium salt;

(b) ion exchange of the zeolite with an ammonium salt with the organic still present in order to remove alkali metal cations;

(c) binding the zeolite with an Al containing material;

(d) drying the catalyst to eliminate excess water; and (e) calcining the catalyst to decompose the occluded organic material and convert the catalyst to the acid or hydrogen form.

In instances where the zeolite is synthesized without an organic directing agent (e.g., in the synthesis of NaY, NaX, or Linde A), a strongly sorbed organic cation can be incorporated into the zeolite by conventional means such as impregnation or excess solution exchange prior to ammonium exchange. In the procedure described above, it is required that the organic directing agent not be readily exchangeable with the ammonium salt used to remove the alkali metal cations. That is, the organic directing agents or strongly sorbed organic cations should have an ion exchange selectivity of at least 20 relative to the ammonium salt used in exchanging the alkali metal cations where the selectivity is characterized by a separation factor, $$\alpha^A_B = \frac{Z_A \cdot S_B}{Z_B \cdot S_A}$$

where A corresponds to the organic directing agent or sorbed organic cation and B corresponds to the ammonium salt used for the alkali metal exchange. $Z_A$, $Z_B$, $S_A$, and $S_B$ are the ionic fraction of A and B in the zeolite and solution phases respectively, as listed in Table 1 below:

TABLE 1
Separation Factors ($\alpha X/Na$) of Various Zeolites at 25° C.
(All Values Measured Relative to Sodium)

|  | Zeolite Beta | ZSM-5 | ZSM-12 | Ionic Radii (A) | Hydrated Radii (A) |
|---|---|---|---|---|---|
| Cs | 13 | 19 | 7.3 | 1.69 | 3.29 |
| $H_3O$ | 1.7 | 18 | 1.6 | 1.50 | 2.82 |
| $NH_4$ | 2.7 | 13 | 1.0 | 1.48 | 3.31 |
| K | 4.9 | 5.2 | 1.8 | 1.33 | 3.31 |
| Ag | 2.5 | 3.2 | 1.2 | 1.26 | 3.41 |
| Na | 1.0 | 1.0 | 1.0 | 0.95 | 3.58 |
| Li | 0.4 | 0.8 | 0.4 | 0.60 | 3.82 |
| TMA | 82 | 190 | 11.0 | 3.20 | 3.20 |
| TEA | 166 | * | 2.9 | 3.95 | 3.95 |
| TPA | 28 | * | 0.15 | 4.50 | 4.50 |
| TBA | * | * | * | — | — |

*Denotes that cation cannot be exchanged out of zeolite if occluded (i.e., during synthesis) and that selectivity is low because cation does not enter into zeolite to any measurable extent at 25° C.
TMA — tetramethyl ammonium cation
TEA — tetraethyl ammonium cation
TPA — tertapropyl ammonium cation
TBA — tetrabutyl ammonium cation In another aspect, the present invention relates to a method for preparing an alumina-bound zeolite composition of low acidic activity. The zeolite has a $SiO_2/Al_2O_3$ molar ratio of at least about 10, a constraint index of less than about 12, contains a framework tetrahedral element selected from the group consisting of B, Ga, In, and Tl and has an alpha value of less than about 100. The resulting alumina-bound composition has an alpha value (based on the zeolite component) of no greater than the alpha value of the zeolite in its unbound form. The method comprises:

(a) ammonium-exchange of the zeolite which contains a bulky, sorbed organic and thereafter (b) calcining said zeolite.

The Alpha value based on the zeolite component is the normalized hexane cracking activity with respect to the zeolite and assumes that the binding material has no activity. For example, a 60% zeolite/40% $Al_2O_3$ catalyst with an alpha of 60 would have an alpha of 100 based on the zeolite component. The zeolite exposed to ammonium-exchange can either be incorporated in an alumina binder or unbound, e.g., an as-synthesized zeolite.

The zeolites which may be treated by the method of the present invention have a constraint index of less than about 12 and include large pore zeolites having a constraint index of less than about 1, such as mordenite, faujasite, zeolite X, zeolite Y, ZSM-3, ZSM-4, ZSM-18 and ZSM-20, as well as intermediate pore zeolites having a constraint index from 1 to 12, such as zeolite beta, ZSM-5, ZSM-11, ZSM-5/ZSM-11 intermediates, ZSM-12, ZSM-23, ZSM-35, ZSM-48, ZSM-50 and other materials, including crystalline silicates having the crystal structure of these zeolites.

Zeolite Y is described in greater detail in U.S. Pat. No. 3,130,007. The entire description contained within this patent, particularly the X-ray diffraction pattern of therein disclosed Zeolite Y, is incorporated herein by reference.

Zeolite beta is described in U.S. Pat. No. 3,308,069. That description, including the X-ray diffraction pattern of zeolite beta, is incorporated herein by reference.

ZSM-3 is described in greater detail in U.S. Pat. No. 3,415,736. That description, and in particular the X-ray diffraction pattern of said ZSM-3, is incorporated herein by reference.

ZSM-4 is described in U.S. Pat. No. 4,021,447. That description, and in particular the X-ray diffraction pattern disclosed therein, is incorporated herein by reference.

ZSM-5 is described in greater detail in U.S. Pat. Nos. 3,702,886 and Re 29,948. The entire descriptions contained within those patents, particularly the X-ray diffraction pattern of therein disclosed ZSM-5, are incorporated herein by reference.

ZSM-11 is described in greater detail in U.S. Pat. No. 3,709,979. That description, and in particular the X-ray diffraction pattern of said ZSM-11, is incorporated herein by reference.

ZSM-5/ZSM-11 intermediate compositions are described in U.S. Pat. No. 4,229,424. That description, and in particular the X-ray diffraction pattern of said compositions disclosed therein, is incorporated herein by reference.

ZSM-12 is described in U.S. Pat. No. 3,832,449. That description, and in particular the X-ray diffraction pattern disclosed therein, is incorporated herein by reference.

ZSM-18 is described in U.S. Pat. No. 3,950,496. That description, and in particular the X-ray diffraction pattern disclosed therein, is incorporated herein by reference.

ZSM-20 is described in U.S. Pat. No. 3,972,983. The entire content thereof, particularly the specification of the X-ray diffraction pattern of the disclosed zeolite, is incorporated herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35, a synthetic ferrierite-type material, is described in U.S. Pat. No. 4,016,245. The description of that zeolite, and particularly the X-ray diffraction pattern thereof, is incorporated herein by reference.

ZSM-48 is more particularly described in U.S. Pat. No. 4,397,827, the entire contents of which are incorporated herein by reference.

ZSM-50 is described in U.S. Pat. No. 4,640,849, the entire contents of which are incorporated herein by reference.

An important characteristic of the crystal structure of these intermediate pore size crystalline silicates is that they provide constrained access to, and egress from, the intracrystalline free space by virtue of having a pore dimension greater than about 5 Angstroms and pore windows of about a size such as would be provided by 10 membered rings of oxygen atoms. It is to be understood, of course, that these rings are those formed by the regular disposition of the tetrahedra making up the anionic framework of the porous crystalline silicate, the oxygen atoms themselves being bonded to the silicon or aluminum atoms at the centers of the tetrahedra. Briefly, some zeolites useful in this invention possess, in combination, an $XO_4$ to $YO_4$ mole ratio, i.e., a silica to alumina mole ratio, of at least about 10; and a structure providing constrained access to the crystalline free space.

The members of the class of intermediate pore size zeolites have an effective pore size of generally from about 5 to about 8 angstroms, such as to freely sorb normal hexane. In addition, the structure provides constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering of the rings or pore blockage may render these zeolites ineffective.

Although 12-membered rings in theory would not always offer sufficient constraint to produce advantageous conversions, it is noted that the puckered 12-ring structure of TMA offretite does show some constrained access. Other 12-ring structures may exist which may be operative for other reasons, and therefore, it is not the present intention to entirely judge the usefulness of the particular porous crystalline silicate solely from theoretical structural considerations.

A convenient measure of the extent to which a zeolite provides control to molecules of varying sizes to its internal structure is the Constraint Index of the porous crystalline silicate. Porous crystalline aluminosilicates which provide a highly restricted access to and egress from its internal structure have a high value for the Constraint Index, and zeolites of this kind have pores of small size, e.g., less than 5 angstroms. On the other hand, porous crystalline aluminosilicates which provide relatively free access to the internal porous crystalline silicate structure have a low value for the Constraint Index, and usually pores of large size, e.g., greater than 8 angstroms. This method by which Constraint Index is determined is described fully in U.S. Pat. No. 4,016,218, incorporated herein by reference for details of the method.

Constraint Index (CI) values for some typical materials are:

|  | CI (at test temperature) |
|---|---|
| ZSM-4 | 0.5 (316° C.) |
| ZSM-5 | 6–8.3 (371° C.–316° C.) |
| ZSM-11 | 5–8.7 (371° C.–316° C.) |
| ZSM-12 | 2.3 (316° C.) |
| ZSM-20 | 0.5 (371° C.) |
| ZSM-22 | 7.3 (427° C.) |
| ZSM-23 | 9.1 (427° C.) |
| ZSM-34 | 50 (371° C.) |
| ZSM-35 | 4.5 (454° C.) |
| ZSM-48 | 3.5 (538° C.) |
| ZSM-50 | 2.1 (427° C.) |
| TMA Offretite | 3.7 (316° C.) |
| TEA Mordenite | 0.4 (316° C.) |
| Clinoptilolite | 3.4 (510° C.) |
| Mordenite | 0.5 (316° C.) |
| REY | 0.4 (316° C.) |
| Amorphous Silica-alumina | 0.6 (538° C.) |
| Dealuminized Y | 0.5 (510° C.) |
| Erionite | 38 (316° C.) |
| Zeolite Beta | 0.6–2.0 (316° C.–399° C.) |

It should be noted that Constraint Index seems to vary somewhat with severity of operations (conversion) and the presence or absence of binders. Likewise, other variables, such as crystal size of the zeolite, the presence of occluded contaminants, etc., may affect the Constraint Index. Therefore, it will be appreciated that it may be possible to so select test conditions, e.g., temperature, as to establish more than one value for the Constraint Index of a particular porous crystalline aluminosilicate. This explains the range of Constraint Indices for some zeolites, such as ZSM-5, ZSM-11 and Beta.

It is to be realized that the above CI values typically characterize the specified porous crystalline aluminosilicates, but that such are the cumulative result of several variables useful in the determination and calculation thereof. Thus, for a given zeolite exhibiting a CI value within the range of 1 to 12, depending on the temperature employed during the test method within the range of 290° C. to about 538° C., with accompanying conversion between 10% and 60%, the CI may vary within the indicated range of 1 to 12. Likewise, other variables such as the crystal size of the porous crystalline aluminosilicate, the presence of possibly occluded contaminants and binders intimately combined with the zeolite may affect the CI. It will accordingly be understood to those skilled in the art that the CI, as utiized herein, while affording a highly useful means for characterizing certain porous crystalline aluminosilicates of interest is approximate, taking into consideration the manner of its determination, with the possibility, in some instances, of compounding variable extremes.

The final catalyst composition comprising zeolite is composed of the crystalline zeolite and a matrix comprising an alumina normally resistant to the temperature and other conditions employed in a chemical conversion process. Such matrix material is useful as a binder and imparts greater resistance to the catalyst for the severe temperature, pressure and reactant feed stream velocity conditions encountered in many processes, such as, for example, cracking. The alumina may be either naturally occurring or in the form of gelatinous precipitates or gels including mixtures of silica and metal oxides.

In addition to the foregoing materials, the zeolites employed herein may be composited with a porous matrix material, such as silica-alumina, as well as ternary compositions, such as silica-alumina-thoria, silica-alumina-zirconia, and silica-alumina-magnesia. The matrix may be in the form of a cogel. The relative proportions of zeolite component and inorganic matrix, on an anhydrous basis, may vary widely with the zeolite content ranging from about 1 to about 99 percent by weight and more usually in the range of from about 5 to about 80 percent by weight of the dry composite.

In general, organic compounds such as, for example, those selected from the group consisting of hydrocarbons, alcohols and ethers, can be converted to conversion products such as, for example, aromatics and lower molecular weight hydrocarbons, over the catalyst composition activated as described above by contact under organic compound conversion conditions including a temperature of from about 100° C. to about 800° C., a pressure of from about 0.1 atmosphere (bar) to about 200 atmospheres, a weight hourly space velocity of from about 0.08 $hr^{-1}$ to about 2000 $hr^{-1}$ and a hydrogen/feedstock organic, e.g., hydrocarbon, compound mole ratio of from 0 (no added hydrogen) to about 100.

In order to more fully illustrate the nature of the invention and the manner of practicing same, the following examples are presented. In the examples, whenever Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant =0.016 $sec^{-1}$). The Alpha Test is described in U.S. Pat. No. 3,354,078 and in *The Journal of Catalysis*, Vol. IV, pp. 527–529 (August 1965), each incorporated herein by reference as to that description.

EXAMPLE 1

Thirty grams of a boron zeolite beta were synthesized according to the following procedure. A reaction mixture was prepared from tetraethylammonium bromide (TEA Br), $H_3BO_3$, NaOH and amorphous precipitated silica (Hi-Sil 233). Alumina was present as an impurity in the silica source. The gel composition in mole ratios was as follows:

| | |
|---|---|
| $SiO_2/B_2O_3$ | 21.9 |
| $OH^-/SiO_2$ | 0.18 |
| $H_2O/OH^-$ | 78.5 |
| $TEABr/SiO_2$ | 0.18 |
| Seeds, wt. % (Based on $SiO_4$). | 2.9 |

Tetraethylammonium bromide, the organic cation source, was added to the NaOH solution in which $H_3BO_3$ had been dissolved. This mixture was added with rapid agitation to the silica source, followed by the rapid addition of zeolite beta seeds (non-boron containing, $SiO_2/Al_2O_3=40$) which had been slurried with $H_2O$.

Aging was carried out for 16 hours at 60° C. and 300 RPM and subsequent crystallization at 140° C. for 5 days at 300 rpm.

The zeolite beta exhibited reference properties shown in Table 2. The material was then exchanged at room temperature with 5 ml/g 1N $NH_4NO_3$ for one hour, rinsed thoroughly with deionized water, exchanged again with 5 ml/g 1N $NH_4NO_3$, rinsed thoroughly with deionized water, and dried at 250° F. for 18 hours. The ammonium exchanged catalyst contained 235 ppm Na, 0.67% B, 1.82% N, and 10.1% C.

This zeolite beta material was then calcined in flowing nitrogen at a heating rate of 1.8° F./min from room temperature to 1000° F. and held in flowing nitrogen at this temperature for 3 hours. The calcination gas was then switched to dry ($PH_2O$ less than 0.5 torr) air and calcined for an additional 3 hours at 1000° F. The resulting catalyst had an alpha of 24.

EXAMPLE 2

The same boron zeolite beta used in preparing the catalyst described in Example 1 was calcined in nitrogen, then in dry air using the procedures described above. The calcined zeolite was then exchanged with 1N $NH_4NO_3$ using the exchange procedure described above. After drying at 250° F. for 18 hours, the catalyst contained 0.4% B, 45 ppm Na, and 0.73% N. The zeolite was then calcined in flowing dry air at a heating rate of 1.8° F./min from room temperature to 1000° F. in flowing air for 3 hours. The finished catalyst had an alpha of 25.

Examples 1 and 2 demonstrate that in the absence of an alumina binder, the alpha of the zeolite is independent of whether the organic directing agent is decomposed before or after the ammonium exchange.

EXAMPLE 3

Three hundred and sixty eight grams of a boron containing zeolite beta having the properties described in Table 2 (81.5% ash) were mixed with 219 grams of alumina Kaiser SA having the properties described in Table 3 (73.6% solids) together with 337 grams of deionized water. The mixture was mulled for 30 minutes, extruded into 1/16-inch extrudates, and dried at 250° F. overnight. The dried catalyst contained 0.49% boron and 1900 ppm Na.

Twenty five grams of this extrudate were calcined at 5° F./min from room temperature to 1000° F. (538° C.) in flowing nitrogen. The catalyst was held at this temperature for three hours and then calcined in dry air at the same temperature for an additional three hours to decompose the occluded tetraethylammonium cation. After calcination, the catalyst had an alpha of 8 and contained 1700 ppm Na and 0.65% boron.

Eleven grams of the calcined catalyst were subsequently ammonium exchanged at room temperature in 5 ml/gram of 1N $NH_4NO_3$ for one hour, rinsed thoroughly, exchanged again at room temperature with 5 ml/g 1 N $NH_4NO_3$, and dried for 18 hours at 250° F. The dried catalyst was calcined in dry air at 1.8° F./min to 1000° F. and held at this temperature in flowing air for 3 hours. The finished catalyst contained 170 ppm Na, 0.27% B and had an alpha of 515. This alpha corresponds to an increase of twenty-fold over the hydrogen form of the unbound boron zeolite beta zeolite.

EXAMPLE 4

Twenty five grams of the uncalcined extrudate used in the preparation of the catalyst described in Example 3 were exchanged twice with 1N $NH_4NO_3$ using the same exchange procedure described above. The exchanged catalyst contained 6.6% C, 1.15% N, 0.48% B and 250 ppm Na. This catalyst was thereafter calcined in nitrogen, then in dry air using the same calcination procedure used above. The finished catalyst contained 0.65% B, 270 ppm Na and had an alpha of 25 based on zeolite.

Examples 3 and 4 demonstrate the importance of the exchange-calcination sequence in determining the degree of activation of the resulting catalyst.

Low acidity catalysts prepared using the method of the present invention may eliminate the need for steaming or other means of framework aluminum removal. The elimination of the calcination of the zeolite prior to ammonium exchange would, along with the elimination of the steaming step, reduce both energy consumption and the length of time that the catalyst resides in the calciner.

TABLE 2

Characteristics of Boron-Aluminosilicate Zeolite Beta

| Composition Analysis, Wt. % | |
|---|---|
| B | 0.95 |
| $SiO_2$ | 84.5 |
| $Al_2O_3$ | 0.54 |
| C | 10.2 |
| H | 2.1 |
| N | 1.5 |
| Na, ppm | 2000 |
| Mole Ratios | |
| $SiO_2/Al_2O_3$ | 264 (326)* |
| $SiO_2/B_2O_3$ | 32 (79) |
| $SiO_2/(B_2O_3 + Al_2O_3)$ | 29 (66) |
| $Na_2O/(B_2O_3 + Al_2O_3)$ | 0.045 |
| $Na_2O/Al_2O_3$ | 0.82 |

*Numbers in brackets are framework values based upon either NMR or TPAD (Temperature Programmed Ammonia Desorption) analyses.

TABLE 3

| Alumina Properties | |
|---|---|
| Composition Analysis, Wt. % | |
| $Na_2O$ | 0.03% |
| $Fe_2O_3$ | 0.06% |
| $SiO_2$ | 0.10% |
| Cl | 0.10% |
| $SO_4$ | 0.02% |
| Phase | Pseudoboehmite |
| Physical Properties | |
| Bulk Density, g/cc | 0.21 |
| Surface Area, $m^2/g$ | 300 |
| Crystallite size | 7 to 30 A |

It is claimed:

1. A method of preparing a composition comprising a zeolite and a matrix comprising alumina wherein the composition exhibits an alpha value of said zeolite, wherein said zeolite has a $SiO_2/Al_2O_3$ molar ratio of at least about 10, has an alpha value of less than about 100 and contains a framework tetrahedral element selected from the group consisting of B, Ga, In and Tl, wherein the method comprises
   (a) providing the zeolite containing an alkylammonium salt;
   (b) ion exchanging the zeolite to replace alkali metal cations with ammonium cations;
   (c) binding the zeolite with an aluminum containing material; and
   (d) calcining the zeolite containing aluminum material to decompose organic material and convert the zeolite to the acid or hydrogen form, and thereby producing said composition having the alpha value which is the alpha value of said zeolite in said acid or hydrogen form, absent said matrix.

2. The method of claim 1, wherein the zeolite containing an alkylammonium salt is an as-synthesized zeolite.

3. The method of claim 1, wherein the zeolite containing aluminum material is dried to eliminate excess water, prior to calcining.

4. The method of claim 1 wherein said element is B.

5. The method of claim 1 wherein said element is Ga.

6. The method of claim 1 wherein said element is In.

7. The method of claim 1 wherein said element is Tl.

8. The method of claim 1 wherein said zeolite has the structure selected from the group consisting of zeolite beta, ZSM-5, ZSM-5/ZSM-11, ZSM-11, ZSM-12, ZSM-23, ZSM-35, ZSM-48, and ZSM-50.

9. The method of claim 1 wherein said zeolite has the structure of zeolite beta.

10. The method of claim 1 wherein said zeolite has the structure of ZSM-5.

11. The method of claim 1 wherein said zeolite has a silica to alumina molar ratio of at least about 100.

12. The method of claim 1 wherein said zeolite has a silica to alumina molar ratio of at least about 250.

13. A method of preparing a composition comprising a zeolite and a matrix comprising alumina wherein the composition exhibits an alpha value of said zeolite, wherein said zeolite has a $SiO_2/Al_2O_3$ molar ratio of at least about 10, has a constraint index of about 1 to 12, has an alpha value of less than about 100 and contains boron as a framework tetrahedral element, wherein the method comprises
   (a) providing the zeolite containing an alkylammonium salt;
   (b) ion exchanging the zeolite to replace alkali metal cations with ammonium cations;
   (c) binding the zeolite with an aluminum containing material; and
   (d) calcining the zeolite containing aluminum material to decompose organic material and convert the zeolite to the acid or hydrogen form, and thereby producing said composition having the alpha value which is the alpha value of said zeolite is said acid or hydrogen form, absent said matrix.

14. The method of claim 13, wherein the zeolite containing an alkylammonium salt is an as-synthesized zeolite.

15. The method of claim 13, wherein the zeolite containing aluminum material is dried to eliminate excess water, prior to calcining.

16. The method of claim 13, wherein said zeolite has the structure selected from the group consisting of zeolite beta, ZSM-5, ZSM-5/ZSM-11, ZSM-11, ZSM-12, ZSM-23, ZSM-35, ZSM-48, and ZSM-50.

17. The method of claim 13, wherein said zeolite has the structure of zeolite beta.

18. The method of claim 13, wherein said zeolite has the structure of ZSM-5.

19. The method of claim 13, wherein said zeolite has a silica to alumina molar ratio of at least about 100.

20. The method of claim 13, wherein said zeolite has a silica to alumina molar ratio of at least about 250.

21. A method of preparing a composition comprising zeolite beta and a matrix comprising alumina wherein the composition exhibits an alpha value of said zeolite beta, wherein said zeolite beta has a $SiO_2/Al_2O_3$ molar ratio of at least about 10, has an alpha value of less than about 100 and contains a framework tetrahedral element selected from the group consisting of B, Ga, In and Tl, wherein the method comprises
   (a) providing the zeolite containing an alkylammonium salt;
   (b) ion exchanging the zeolite to replace alkali metal cations with ammonium cations;
   (c) binding the zeolite with an aluminum containing material; and
   (d) calcining the zeolite containing aluminum material to decompose organic material and convert the zeolite to the acid or hydrogen form, and thereby producing said composition having the alpha value which is the alpha value of said zeolite in said acid or hydrogen form, absent said matrix.

22. The method of claim 21, wherein the zeolite beta is in as-synthesize form.

23. The method of claim 21, wherein the zeolite containing aluminum material is dried to eliminate excess water, prior to calcining.

24. The method of claim 21, wherein said element is B.

25. The method of claim 21, wherein said zeolite hs a silica to alumina molar ratio of at least about 100.

26. The method of claim 21, wherein said zeolite has a silica to alumina molar ratio of at least about 250.

27. The method of claim 21, wherein the organic is selected from the group consisting of tetramethyl ammonium, tetraethyl ammonium, tetrapropyl ammonium and tetrabutyl ammonium cations.

* * * * *